United States Patent [19]

Shibata et al.

[11] Patent Number: 5,123,937
[45] Date of Patent: Jun. 23, 1992

[54] DEAERATING FILM AND DEAERATING METHOD

[75] Inventors: Yoshihiko Shibata; Yoshihiro Chikamori; Youichi Shimizu, all of Wake, Japan

[73] Assignee: Japan Gore-Tex Inc., Tokyo, Japan

[21] Appl. No.: 742,025

[22] Filed: Aug. 8, 1991

Related U.S. Application Data

[63] Continuation-in-part of Ser. No. 582,225, Oct. 1, 1990.

[30] Foreign Application Priority Data

Feb. 3, 1989 [JP] Japan .................................. 1-23987

[51] Int. Cl.$^5$ .............................................. B01D 19/00
[52] U.S. Cl. ............................................ 55/16; 55/55; 55/159; 55/189
[58] Field of Search ................. 55/16, 36, 52, 55, 158, 55/159, 189

[56] References Cited

U.S. PATENT DOCUMENTS

| | | | |
|---|---|---|---|
| 3,778,971 | 12/1973 | Granger et al. | 55/159 |
| 4,325,715 | 4/1982 | Bowman et al. | 55/159 X |
| 4,469,495 | 9/1984 | Hiraizumi et al. | 55/189 |
| 4,484,936 | 11/1984 | Sakai | 55/159 |
| 4,787,921 | 11/1988 | Shibata et al. | 55/52 X |
| 4,923,650 | 5/1990 | Antoon, Jr. et al. | 55/159 X |
| 4,985,055 | 1/1991 | Thorne et al. | 55/189 |
| 4,986,837 | 1/1991 | Shibata | 55/158 |

FOREIGN PATENT DOCUMENTS

| | | | |
|---|---|---|---|
| 0360009 | 3/1990 | European Pat. Off. | 55/16 |
| 56-005121 | 1/1981 | Japan | 55/16 |
| 57-170176 | 10/1982 | Japan . | |
| 59-216606 | 12/1984 | Japan | 55/189 |
| 60-24303 | 2/1985 | Japan . | |
| 60-048104 | 3/1985 | Japan | 55/159 |
| 61-31164 | 2/1986 | Japan . | |
| 62-132509 | 6/1987 | Japan | 55/189 |
| 63-236516 | 10/1988 | Japan | 55/158 |
| 01063007 | 3/1989 | Japan | 55/158 |

Primary Examiner—Robert Spitzer
Attorney, Agent, or Firm—Frishauf, Holtz, Goodman & Woodward

[57] ABSTRACT

A degassing method comprising directing a liquid feed containing gas and bubbles into a breathable membrane to remove the bubbles and then into a deaerating module containing a gas-permeable membrane.

17 Claims, 2 Drawing Sheets

DEAERATING FILM AND DEAERATING METHOD

CROSS-REFERENCE TO RELATED APPLICATION

This is a continuation-in-part application of Ser. No. 07/582,225, filed Oct. 1, 1990.

TECHNICAL FIELD

This invention relates to a deaerating film and a deaerating (degassing) method and, more particularly, to a deaerating film and a deaerating method, which can deaerate a target gas with accuracy and which can effectively perform deaeration by using comparatively compact deaerating equipment.

BACKGROUND INFORMATION

Heretofore, it is known to use a porously textured resin film in order to deaerate gases from treating water, supply water for piping, operating oil, coating solutions, and so on in boilers, pure water manufacturing equipment and so on.

To this end, there has been adopted, for example, a film material, such as porous cellulose acetate, polyamide resin, polytetrafluoroethylene resin, which is supported in a spiral shape, in a tubularly wound shape, in a flat plate shape (in a pressure-resistant plate shape) or the like, by a support body in a porous sheet.

Although it is noted as a matter of course that such conventional deaerating films can remove gases contaminated within a liquid, the films cause a large quantity of vapor to penetrate therethrough and to be discharged from the liquid, together with target gases, when they are used at liquid temperatures as high as 30° C. or higher or at such a high-vacuum condition as exceeding the vapor pressure of the liquid. Therefore, in this case, a stroke volume of a vacuum pump to be used for deaeration should become remarkably large and the liquid to be treated is required to be cooled to a temperature as low as 30° C. or below. Furthermore, a quantity of the liquid obtainable by deaeration is caused to be reduced by such treatment. Accordingly, the conventional deaerating methods are said to be disadvantageous from a standpoint of equipment or running operation.

SUMMARY OF THE INVENTION

The present invention is directed to a deaerating film which is formed by superposing and sticking a solid gas-permeable layer to and on a fibrillated porous resin film. For example, a polytetrafluoroethylene film is fibrillated by an expanding treatment so as to have a maximum pore size of 5 microns or smaller and a porosity of 25% to 95%, and the gas-permeable and solid layer consisting of a silicone or a fluorosilicone having a film thickness ranging from 1 to 150 microns is superposed on and stuck to the resulting film by coating or laminating.

Further, the deaerating method according to the present invention comprises carrying out deaeration in a deaerating module after bubbles in a liquid to be supplied to the deaerating module have been removed by an air valve, which in turn is disposed on the side of a liquid inlet of the deaerating module formed by using a film having a gas permeability.

DETAILED DESCRIPTION OF THE INVENTION

Figure 1:
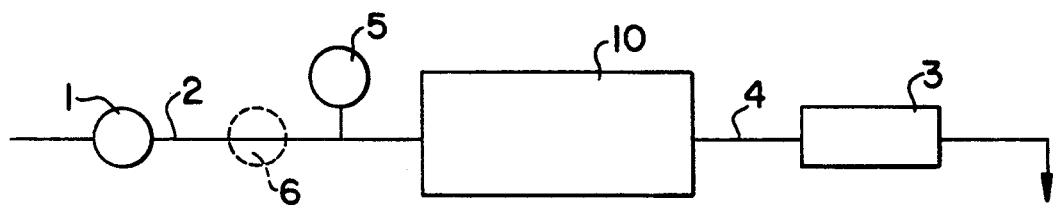
FIG. 1 illustrates the technical content of the present invention and FIG. 1 is a schematic representation showing an example of apparatuses for carrying out this invention.

In FIG. 1, reference numeral 1 stands for a pump, reference numeral 2 for a supply pipe, reference numeral 3 for instrumentation means, reference numeral 4 for a discharging pipe, reference numeral 5 for an air valve, reference numeral 6 for heating means, and reference numeral 10 for a film module for deaeration.

Figure 2:
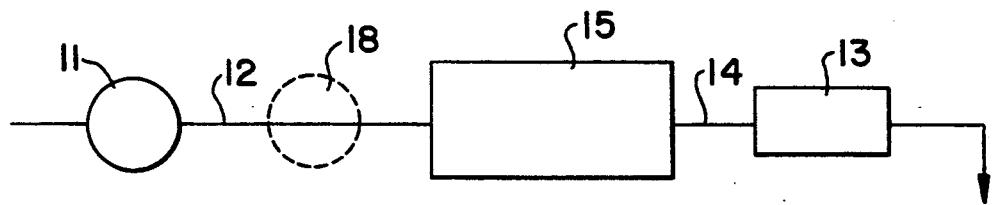
FIGS. 2, 3 and 4 are schematic diagrams of other apparatus for carrying out the present invention.
Figure 3:
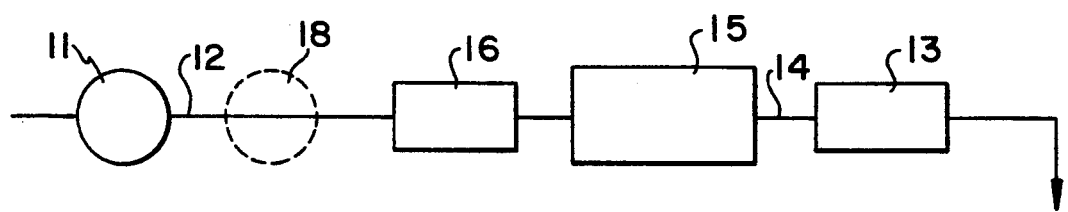
Figure 4:
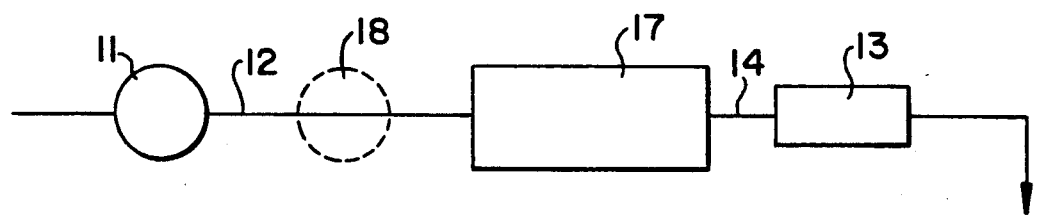

In FIGS. 2 to 4, the reference numerals correspond to the following items:
11: pump
12: supply pipe
13: instrumentation means
14: discharge pipe
15: module 1
16: module 2
17: module 3
18: heating means.

BEST MODES FOR CARRYING OUT THE INVENTION

The porous resin film is integrally superposed on and stuck to the solid gas-permeable layer, thereby assuming a state and form suitable for a deaerating module in an arbitrary manner and providing strength, pressure resistance and so on.

The solid gas-permeable layer allows gases to permeate therethrough yet has a high resistance to the penetration of vapors therethrough, thereby reducing an amount of water vapor permeating through the layer to a remarkably low extent.

Therefore, the solid gas-permeable layer can provide a preferred deaerating action even at a temperature as high as 30° C. or higher or at such a high-vacuum condition as exceeding the vapor pressure of the liquid to be an object for deaeration.

Further, although the film material is considered to be used for deaeration from the liquid as described hereinabove, a film area required in the deaerating method utilizing this film is determined by an amount of gases contaminated (a total amount of bubbles and dissolved gases) and an amount of gases per unit time penetrating through the film. In this case, generally, the amount of the gases in a form of bubbles is very large as being proportional to the amount of the dissolved gases, and a majority of the film area required for continuous deaeration is the area required for removal of the gases in the form of bubbles. In other words, in such a case as in a viscous solution which contains a large quantity of bubbles, a very large film area is required, thereby resulting as a consequence in making overall equipment containing a module with such film built therein, a pump for feeding a liquid, a vacuum pump and other equipment oversized and suffering from the disadvantages that equipment and running costs become too expensive.

In order to avoid these disadvantages, the present invention can reduce the film area which is otherwise required, by disposing an air removing means such as an air valve or a liquid proof breathable membrane on the side of the liquid inlet of the deaerating module and by carrying out deaeration in the deaerating module after the bubbles present in the liquid fed into the deaerating module have been removed in advance by the air removing means, such as the air valve or the liquid proof breathable membrane.

In the case that a membrane having a gas permeable solid layer such as a silicone solid layer placed on a porous substrate such as a porous expanded polytetrafluoroethylene substrate is used to degas a liquid having bubbles, it is possible to remove the gas dissolved in the liquid, but it is impossible to remove the gas contained as bubbles in the liquid. This is because a solid layer allows only a small quantity of gas to pass through it however permeable it may be, and the quantity of a gas dissolved in a liquid is usually as small as scores of ppm, while that of a gas contained as bubbles in a liquid is as large as several percent.

Such being the case, if any means with suitable selectively to remove bubbles is installed prior to the degassing means using the above-mentioned gas permeable solid membrane and the selective removal of the bubbles is in advance carried out, the abovementioned degassing means using the solid membrane can smoothly remove the gas dissolved in the liquid. As such a means with suitable selectively to remove the bubbles in a liquid are a module using a breathable porous membrane, an air valve having a check valve, etc. Thus, by the combination of the debubble means and the degassing means smooth and efficient removal both of bubbles and dissolved gas in a liquid can be accomplished.

On the other hand, if it is attempted to remove both bubbles and dissolved gas in a liquid by using only a debubble means, a great quantity of liquid vapor also will be lost along with the gas because of the breathability. Consequently, besides the great quantity of liquid loss, suction equipment having a huge capacity proportional to the increased quantity of vapor is needed.

Regarding a module using a breathable porous membrane, any type of module would be acceptable, if it functions well in removing bubbles. Among them a popular one is a tube type, a spiral type in which a bag comprising of a breathable porous membrane is spirally wound along with a spacer in a cylindrical vessel, a cylindrical type in which a cylinder comprising a breathable porous membrane is used, a plate type in which a flat membrane comprising a breathable porous material with or without a reinforcing backing is stacked on a supporting plate and a spacer like member providing a filter press structure, and so on.

Regarding the air-removing means, the above-mentioned various types of modules such as a tube type, a spiral type, a cylindrical type, a plate type etc., an air valve having a check valve, and so on are non-limiting examples thereof.

The range of the properties for the liquid proof breathable membrane can be defined from the viewpoint of several factors.

One of the factors is the liquid leakage problem. From this viewpoint, the smaller a pore size is, the higher the liquid pressure a membrane can resist without leakage. If the material is an expanded porous polytetrafluoroethylene and the liquid is water, the pore size is required to be less than 0.4 micrometers for the membrane to resist the usual lowest operating water pressure, and preferably it is to be less than 0.2 micrometers to resist the desirable operating water pressure. The range of pore size is dependent on the material and the liquid.

Another factor is the debutting efficiency. From this viewpoint, Gurley's number is used as a measure of air permeability. Gurley's number is defined as the time (seconds) for air of 100 cubic centimeters to pass through a membrane area of 6.45 square centimeters under a water head pressure of 12.4 cm. So the higher the air permeability of the membrane is, the smaller the Gurley's number of the membrane is. Thus the Gurley's number of a membrane is required to be less than 1000 seconds for bubbles in a liquid to be completely removed, and more preferably it to be less than 500 seconds.

Regarding the lower limit of the Gurley's number, as far as the removal of bubbles is concerned, zero seconds is not only the limit, but also the optimum. But in reality such a membrane has a very large pore size, so from the viewpoint of leakage it is impractical. However, pore size is not always correlated with Gurley's number, so it is not possible to determine the lower limit of the Gurley's number from the above-mentioned limit of the pore size.

Porosity has no direct correlation with Gurley's number or pore size. If the objective liquid is water, for the membrane to be water proof and breathable it must be made of a hydrophobic material such as polytetrafluoroethylene, polypropylene, polyethylene etc. Among the aforementioned materials expanded porous polytetrafluoroethylene is the most desirable in terms of air permeability (breathability) for efficient debubbling and prevention of water leakage.

However, if a solid membrane such as a silicone membrane is combined with the fibrillated porous resin film, the fibrillated porous resin film can be made of broader groups of resins irrespective of hydrophobicity. Thus, polyester, polyamide and or any resin which can endure other conditions or requirements can be used.

The pore size to be used for the membrane is the maximum pore size obtainable from a bubble point based on ASTM F316-80.

Non-limiting examples of gases degassed by the inventive process include air and oxygen. This is partly because the atmosphere is composed of air, and partly because oxygen dissolved in liquid has a crucial influence on practical problems such as corrosion, oxidation, etc.

EXAMPLES

The present invention will be described more specifically by way of examples as follows:

EXAMPLE 1

In this invention, a porous resin film fibrillated by expanding treatment is used as a base material. For instance, a polytetrafluoroethylene film is expanded so as to become porous as having a porosity of 50% or greater, particularly ranging from 70% to 95%, and its texture is constructed so as to have an infinite number of fine fibers intertwined in a cobweb form among a large number of fine node sections so as to have a maximum pore size ranging from about 0.1 to 2 microns. Such a fine texture structure, in association with water repellency resulting from its material, can suppress water and other liquid from permeating through the film, yet can effectively allow the gases to pass therethrough. On top of the polytetrafluoroethylene, a polysulfone, a polyethylene, a polypropylene and so on can likewise be adopted by making them porous.

The present invention comprises superposing and sticking the solid gas-permeable layer on and to the base material. As the solid gas-permeable layer, there may be adopted silicone, fluorosilicone, natural rubber, polybutadiene, ethyl cellulose, vinyl acetate copolymer and other materials which have high resistance to the permeation of vapor, yet which allow gases to be permeated therethrough, and the solid layer composed of those materials are stuck to the base material by means of coating or laminating. In some cases, the solid layer may adhere to the base material by using an air-permeable adhesive. The solid layer may generally be stuck on one side of the base material, although it may be stuck on both sides of the base material if the situation allows.

Although the above-mentioned base material may be used in an arbitrary film thickness, its film thickness may range usually from about 10 to 1,000 microns, particularly from about 30 to 150 microns. The solid layer is set so as to have a film thickness generally as thick as 5 microns or more, preferably as thick as 10 microns or more, in order to effectively provide the ability of shutting water vapor off, while having a film thickness generally as thick as approximately 100 microns or smaller, preferably as thick as approximately 30 microns or smaller, in order to ensure the gas permeability.

As a specific example of preparation, the polytetrafluoroethylene was subjected to an expanding treatment providing a fibrillated porous film having a porosity of 76%, a maximum pore size of 0.4 micron and a film thickness of 140 microns. On this fibrillated film was coated a polydimethylsiloxane resin so as to provide a solid layer having a film thickness of 30 microns, thereby producing a deaerating film. This deaerating film was formed into a spiral module having a film area as broad as 2.4 square meters, and the spiral module was tested for its deaerating ability by passing water having the temperature of 25° C. therethrough at an average speed of 1 liter per minute under the pressure of 20 torr. As a result of the test, it was found that oxygen (O$_2$), was removed at the average rate of approximately 8 p.p.m. and the amount of steam generated was very small as low as 9.7 grams per hour.

As a comparative example for the conventional method, a spiral module was prepared by using the above-mentioned porous polytetrafluoroethylene having the film thickness of 140 microns as the deaerating film and subjected to a deaerating treatment under the same conditions as described hereinabove. As a result, it was found that the amount of oxygen removed was as high as approximately 8 p.p.m. as in the above case, while vapor was generated at the rate of 321 grams per hour.

In other words, it was confirmed that the deaerating film according to the present invention could reduce the amount of vapor generated to less than one thirtieth by treating it at the temperature of 25° C. under the conditions as described hereinabove.

The present inventors have made a study on natural rubber, polybutadiene, ethyl cellulose, vinyl acetate copolymer and other solid gas-permeable layers, in addition to silicone and fluorosilicone as described hereinabove. As a result, it was found that when each of those solid gas-permeable layers was laminated, the amount of vapor generated can be reduced to a considerably large extent, at least as low as to one tenth or lower, and in some cases as low as to one hundredth, thereby performing efficient deaeration.

EXAMPLE 2

An outline of equipment is shown in the accompanying drawing for deaeration (FIG. 1) by using the deaerating film obtained in Example 1 in the manner as described hereinabove. To the film module 10 having the deaerating film was supplied under pressure a liquid containing bubbles by the pump 1 through the pipe 2, and the deaerated liquid was discharged from the film module 10 through the discharging pipe 4 with the instrumentation means 3 disposed thereafter. The air valve 5 was disposed between the pump 1 disposed at the pipe 2 and the film module 10, thereby removing the bubbles in the liquid to be treated. The heating means 6 may be disposed, if necessary, between the pump 1 and the air valve 5, thereby enabling the deaeration to be carried out by the air valve 5 after heating.

Description will now be made of the result of deaerating ethylene glycol using the equipment as described hereinabove. To the module 10 was supplied ethylene glycol containing bubbles (having diameters of 0.1 to 5 mm) at the volume ratio of 3% at 5° C. at the speed of 1 liter per minute. For the conventional general method which does not use the air valve 5, the module 10 required a silicone film having the film thickness of 100 microns as broad as 12 m$^2$ in area in order to reduce the concentration of the dissolved oxygen to 3 p.p.m. or lower, while the module 10 required the same silicone film as broad as 3.5 m$^2$ in area, i.e., its film area can be reduced to as low as less than one third, when an air valve (Model: AF-8; Kabushiki Kaisha Ben Seizou Hanbai) was used as the air valve 5 according to the present invention. The air valve can be a ball type valve such as the type AF-8H manufactured by Ben Corporation in Japan. In order to prevent back gas flow, a check valve having a pliable plastic member is disposed at the liquid exit. Hence, it was confirmed that the present invention can reduce equipment costs and operational expenses to a large extent. In this case, when there was provided equipment for heating the liquid to the temperature as high as 40° C., the silicone film was sufficient in area as broad as 2.5 m$^2$ in order to reduce the concentration of the dissolved oxygen to 3 p.p.m. or lower. In this case, it is possible to lower costs of equipment and running operation further.

EXAMPLE 3

Not Using Breathable Porous Membrane To Compare With The Present Invention

The equipment used is shown in FIG. 2. To the module 1 was supplied under the pressure of 0.7 kg per square centimeters water containing dissolved oxygen at a concentration of 8.1 ppm and bubbles (having diameters of 0.1 to 5 mm) at the volume ratio of 5% at 25° C. and at the speed of 4 liter per minute.

The module 1 was composed of a cylindrical vessel made of polyvinylchloride having a diameter of 25 cm and a height of 80 cm, in which 120 tubes having a length of 10 m were installed in a coil ("tube type" apparatus). Each tube was composed of a substrate tube made of an expanded porous polytetrafluoroethylene having a porosity of 50%, an inner diameter of 2 mm and a wall thickness of 0.4 mm, and a silicone solid tube having a wall thickness of 125 micrometers is tightly inserted into the substrate tube.

The supplied water flowed inside the tubes of the module 1 and the air pressure outside the tubes was reduced to as low as 30 torrs by using the attached suction equipment.

After the water passed through the module under the above operation, most of the bubbles contained in the original water still remained in the processed water and no oxygen dissolved in the original water was removed.

The purpose of this example is to show the importance of a breathable membrane module for removing bubbles.

EXAMPLE 4

Using Liquid proof Breathable Porous Membrane According To The Present Invention For the purpose of comparison, an operation according to the present invention (a working example) was carried out. In this case, the equipment used is shown in FIG. 3. Thus, before the same water as in the above comparative example (Example 3) was supplied to the module 1, it was supplied to the module 2 mainly to remove the bubbles contained in the water. The water supplying conditions such as pressure, temperature and speed were the same as in the above comparative example (Example 3).

The module 2 was composed of a cylindrical vessel made of polyvinylchloride having a diameter of 4 cm and a height of 30 cm, in which 5 tubes having a length of 70 cm were installed in a coil. Each tube was composed of only an expanded porous polytetrafluoroethylene tube having a porosity of 50%, an inner diameter of 3 mm and a wall thickness of 0.5 mm for removing the bubbles.

The supplied water flowed inside the tubes of the module 2 and the air pressure outside the tubes was reduced to as low as 100 torrs by using the attached suction equipment.

After the water passed through the module 2 under the above operation, no visible bubbles remained in the processed water and at this stage about 10% of the oxygen dissolved in the original water was removed.

After the above operation the debubbled water was supplied to the module 1 at the same water supplying conditions of pressure, temperature and speed as in the prior processing. The module 1 was quite the same in constitution as the module 1 in the above-mentioned comparative operation (Example 3). And in the same way the debubbled water flowed inside the tubes of the module 1 and the air pressure outside the tubes was reduced to as low as 30 torrs.

After the water passed through the module 1 under the above operation, 70% of the oxygen dissolved in the original water was removed and no visible bubbles remained in the water.

EXAMPLE 5

Using Only Breathable Porous Membrane To Remove Dissolved Oxygen To As Low As The Level Of The Present Invention For The Purpose Of Comparison In order to show how excellent the present invention is, the captioned operation was carried out. In this case equipment used is shown in FIG. 4. Thus, to the module 3 was supplied the same water as in Example 3 the same water supplying condition as in Example 3.

The module 3 was composed of a cylindrical vessel made of polyvinylchloride having a diameter of 25 cm and a height of 70 cm, in which 120 tubes having a length of 6 m were installed in a coil. Each tube was composed of only an expanded porous polytetrafluoroethylene tube having a porosity of 50%, an inner diameter of 2 mm and a wall thickness of 0.4 mm.

The supplied water flowed inside the tubes of the module and the air pressure outside the tubes was reduced to as low as 30 torrs by using the attached suction equipment.

After the water passed through the module 3 under the above operation, 70% of the oxygen dissolved in the original water was removed and no visible bubbles remained in the water. So from the viewpoint of the oxygen concentration and the bubbles, the quality of the processed water was the same as that in the operation according to the present invention. However, in this case about 3600 g per hour of the water was lost by overevaporation, while in the above-mentioned operation according to the present invention the quantity of the lost water was only 15 g per hour. The most serious problem caused by this excess water evaporation was that the capacity of the suction equipment must be increased in proportion to the quantity of the evaporated water.

The purpose of this example is to demonstrate the difficulties when only a breathable membrane module is used.

INDUSTRIAL APPLICABILITY

As described hereinabove, this invention enables an appropriate application to various deaerating mechanism and reduces the permeability of vapors to a large extent thereby making the stroke volume of the vacuum pump for deaeration smaller, thereby rendering the overall system of the deaerating mechanism compact from a standpoint of equipment and low in cost from a standpoint of running operation and as a result presenting the advantage that the deaerating treatment can be carried out in an efficient manner. Further, the present invention can deaerate the target gases from treating water for boilers o pure water manufacturing equipment, supply water for piping, operating oil or coating solutions.

What is claimed is:

1. A degassing method comprising directing a liquid feed containing gas and bubbles into an air-removing means to remove said bubbles and then into a liquid inlet of a deaerating module comprising a gas-permeable membrane and carrying out deaeration in the deaerating module after the bubbles in a liquid fed into the deaerating module have been removed by the air-removing means.

2. The degassing method of claim 1 wherein the air-removing means is a module comprising a liquid proof breathable membrane for removing bubbles.

3. The degassing method of claim 2 wherein the liquid proof breathable membrane is in the form of a tube.

4. The degassing method of claim 3, wherein the tube is an expanded porous polytetrafluoroethylene tube.

5. The degassing method of claim 4, wherein the expanded porous polytetrafluoroethylene has a porosity of 50%.

6. The degassing method of claim 2 wherein the liquid proof breathable membrane is in the form of a sheet spirally wound in a vessel.

7. The degassing method of claim 2 wherein the liquid proof breathable membrane is in the form of a flat sheet.

8. The degassing method of claim 2, wherein the gas permeable membrane comprises a composite of a solid gas-permeable layer and a fibrillated porous resin film.

9. The degassing method of claim 8, wherein the solid gas-permeable layer comprises a silicone, fluorosilicone, natural rubber, polybutadiene, ethyl cellulose or vinyl acetate copolymer, which is coated or laminated on the fibrillated porous resin film.

10. The degassing method of claim 9, wherein the fibrillated porous resin film is polytetrafluoroethylene.

11. The degassing method of claim 10, wherein the fibrillated porous resin film is a polytetrafluoroethylene having a maximum pore size of 5 microns and a porosity of 25 to 95%.

12. The degassing method of claim 10, wherein the fibrillated porous resin film is a polytetrafluoroethylene having a porosity of 70 to 95% and a maximum pore size of 0.1 to 2 microns.

13. The degassing method of claim 12, wherein the solid gas-permeable layer comprises silicone or fluorosilicone.

14. The degassing method of claim 13, wherein the porous resin film has a thickness of 10 to 1,000 microns and the solid gas-permeable layer has a thickness of 5 microns to 100 microns.

15. The degassing method of claim 13, wherein the porous resin film has a thickness of 30 to 150 microns and the solid gas-permeable layer has a thickness of 10 microns to 30 microns.

16. The degassing method of claim 2, wherein the liquid is water, the gas is oxygen, and the breathable membrane comprises expanded porous polytetrafluoroethylene having a pore size less than 0.4 mm and a Gurley's number of less than 1000 seconds.

17. The degassing method of claim 16, wherein the pore size is less than 0.2 mm and the Gurley's number is less than 500 seconds.

* * * * *